United States Patent
Sakamoto et al.

(10) Patent No.: US 9,224,199 B2
(45) Date of Patent: *Dec. 29, 2015

(54) PATHOLOGICAL DIAGNOSIS ASSISTING APPARATUS, PATHOLOGICAL DIAGNOSIS ASSISTING METHOD AND NON-TRANSITORY COMPUTER READABLE MEDIUM STORING PATHOLOGICAL DIAGNOSIS ASSISTING PROGRAM

(71) Applicants: KEIO UNIVERSITY, Tokyo (JP); NEC CORPORATION, Tokyo (JP)

(72) Inventors: Michiie Sakamoto, Tokyo (JP); Akinori Hashiguchi, Tokyo (JP); Tokiya Abe, Tokyo (JP); Akira Saito, Tokyo (JP); Maki Sano, Tokyo (JP)

(73) Assignees: KEIO UNIVERSITY, Tokyo (JP); NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,931

(22) Filed: Nov. 21, 2012

(65) Prior Publication Data

US 2013/0136324 A1    May 30, 2013

(30) Foreign Application Priority Data

Nov. 24, 2011    (JP) .................. 2011-255989

(51) Int. Cl.
  *G06K 9/00*    (2006.01)
  *G06T 7/00*    (2006.01)
(52) U.S. Cl.
  CPC .................. *G06T 7/0012* (2013.01)
(58) Field of Classification Search
  None
  See application file for complete search history.

(56) References Cited

U.S. PATENT DOCUMENTS

| 7,467,119 B2* | 12/2008 | Saidi et al. ............ 706/21 |
| 7,483,554 B2* | 1/2009 | Kotsianti et al. ........ 382/128 |
| 2004/0207735 A1* | 10/2004 | Kameyama ........ G06T 3/4061 348/239 |
| 2006/0103055 A1* | 5/2006 | Hoshuyama ....... B01D 67/0027 264/479 |
| 2007/0014460 A1* | 1/2007 | Kuziela et al. ........ 382/128 |
| 2007/0121179 A1* | 5/2007 | Yoshida ........ H04N 1/4076 358/504 |

(Continued)

FOREIGN PATENT DOCUMENTS

JP    2010-185858 A    8/2010

OTHER PUBLICATIONS

Demir, Cigdem, and Bulent Yener. "Automated cancer diagnosis based on histopathological images: a systematic survey." Rensselaer Polytechnic Institute, Tech. Rep (2005).*

(Continued)

*Primary Examiner* — Sumati Lefkowitz
*Assistant Examiner* — Carol Wang
(74) *Attorney, Agent, or Firm* — Maschoff Brennan (57) ABSTRACT

A pathological diagnosis assisting apparatus according to the present invention includes an image classification unit configured to classify at least one type of a specific substance, a tissue area extraction unit configured to extract a tissue area in the image of the sample, an image dividing unit configured to divide the tissue area into a plurality of sections, a specific substance occupancy rate calculation unit configured to, calculate an occupancy rate of the at least one type of the specific substance in each of the plurality of sections, and a diagnosis assisting information providing unit configured to determine an intermediate value of the occupancy rate of the specific substance from the calculated occupancy rates of the plurality of sections and to provide the intermediate value as the diagnosis assisting information.

4 Claims, 6 Drawing Sheets

(56) References Cited

U.S. PATENT DOCUMENTS

| | | | |
|---|---|---|---|
| 2007/0269112 A1* | 11/2007 | Yamamoto | H04N 1/4092 382/195 |
| 2008/0074649 A1* | 3/2008 | Levenson et al. | 356/73 |
| 2008/0260218 A1* | 10/2008 | Smith et al. | 382/128 |
| 2010/0054560 A1* | 3/2010 | Yamashita et al. | 382/128 |
| 2010/0272334 A1* | 10/2010 | Yamada et al. | 382/128 |
| 2011/0274340 A1* | 11/2011 | Suzuki | G06T 7/0012 382/133 |
| 2012/0092476 A1* | 4/2012 | Diamant | H04N 19/63 348/79 |

OTHER PUBLICATIONS

Calvaruso V. et al., "Computer-assisted image analysis of liver collagen: Relationship to Ishak scoring and hepatic venous pressure gradient" Hepatology vol. 49, Issue 4, pp. 1236-1244, Apr. 2009.

\* cited by examiner

PATHOLOGICAL DIAGNOSIS ASSISTING APPARATUS, PATHOLOGICAL DIAGNOSIS ASSISTING METHOD AND NON-TRANSITORY COMPUTER READABLE MEDIUM STORING PATHOLOGICAL DIAGNOSIS ASSISTING PROGRAM

FIELD OF THE INVENTION

The present invention relates to a pathological diagnosis assisting apparatus, a pathological diagnosis assisting method and a non-transitory computer readable medium storing a pathological diagnosis assisting program.

BACKGROUND OF THE INVENTION

Progression of destruction and tissue fibrosis due to chronic inflammation in some organs are known to carry a risk of cancerogenesis. Assessment of a stage of tissue fibrosis is of great importance in order to find a phase of the progression of a lesion and, further, to determine the risk of the cancerogenesis.

Chronic hepatitis is known as a disease which assessment of the stage of fibrosis of the tissue is of importance. As a method to assess the stage of tissue fibrosis, there is histopathological diagnosis. In histopathological diagnosis, a pathologist visually diagnoses a structural disorder due to the fibrotic tissues. Generally, New Inuyama Classification is used for a diagnosis of the stage of fibrosis of a liver tissue. According to New Inuyama Classification, the stage of fibrosis is classified into four stages of F1 to F4. In detail, the stage of fibrosis is classified into: no fibrosis (F0), peripheral expansion of fibrosis (F1), formation of fibrous cross-linking (F2), formation of the fibrous cross-linking associated with a strained lobule (F3), and cirrhosis (F4). However, since such classification is subjectively made by the pathologist using a pathology sample based on his/her own knowledge and experience, diagnosis according to the classification requires certain proficiency.

Also, in order to assess the stage of fibrosis, there is a method, by processing an image of the pathology sample stained by a stain such as Sirius red and the like for staining a collagenous fiber, to identify an area of the collagenous fiber and to calculate an area occupancy rate of the collagenous fiber (for example, see Non-Patent Document 1). The reason focusing on the collagenous fiber is that it has become known that, with the progression of the stage of fibrosis, the area occupancy rate of the collagenous fiber increases in the tissue. The method according to Non-Patent Document 1, by using a threshold interactively determined by the operator for each of values of RGB (Red, Green, Blue) components and values of HSV (Hue, Saturation, Value) components of the image of the stained sample, the area of the collagenous fiber is extracted. Then, from the extracted area of the collagenous fiber, collagenous fibers forming the blood vessel and the capsule that are irrelevant to the collagenous fiber associated with fibrosis due to a lesion are manually eliminated by the operator. Such a manual operation is troublesome and has a risk of variation in accuracy of calculation of the area occupancy rate of the collagenous fiber between operators.

As such, there is suggested an image processing apparatus capable of identifying a blood vessel area by appropriately distinguishing it from other areas (for example, see Patent Document 1). The image processing apparatus described in Patent Document 1 may detect an appearance pattern of an elastic fiber near a bright area in the image of the sample and, based on a result of the detection, identify an area including the bright area as the blood vessel area.

RELATED ART DOCUMENTS

Patent Document

Patent Document 1: Japanese Patent Laid-Open No. 2010-185858

Non-Patent Document

Non-Patent Document 1: Calvaruso V et al. Computer-Assisted Image Analysis of Liver Collagen: Relationship to Ishak Scoring and Hepatic Venous Pressure Gradien. HEPATOLOGY 2009; 49:1236-1244

SUMMARY OF THE INVENTION

Incidentally, the collagenous fiber exists not only in the fibrotic tissue but also in tissues of the blood vessel and the capsule for forming basic structures of the tissues. Accordingly, in providing medical diagnosis assisting information related to tissue fibrosis, it is necessary to calculate the area occupancy rate of the collagenous fiber in the tissue by eliminating the existing collagenous fiber forming the blood vessel and the like.

However, although the image processing apparatus according to Patent Document 1 may detect the blood vessel area based on the appearance pattern of the elastic fiber and, by eliminating the blood vessel area, eliminate the area of the collagen fiber in the blood vessel area, this apparatus is not able to eliminate the collagenous fiber in a structural area other than the blood vessel, such as the capsule. Accordingly, the conventional techniques are not able to automatically calculate the area of the collagenous fiber by, for example, supervised classification, learned classification or texture-based classification. In order to provide an index useful for the pathological diagnosis, it remains necessary for the operator to manually eliminate the collagenous fiber other than the collagenous fiber associated with fibrosis.

As described above, since a specific substance used for detection of the lesion (fibrotic tissue) such as the collagenous fiber exists in a non-lesional tissue area, in order to obtain an amount of the specific substance associated with the lesion, it has been necessary to eliminate the specific substance that is not associated to the lesion. The specific substance serves as the index for detection of the lesion and may be, for example, the collagenous fiber that is capable of providing pathological diagnosis assisting information based on its amount and distribution in the tissue.

Accordingly, it is an object of the present invention, in consideration of such conditions, to provide a pathological diagnosis assisting apparatus capable of automatically calculating an occupancy rate of the specific substance serving as the index for detection of the lesion and providing the occupancy rate as the diagnosis assisting information, a pathological diagnosis assisting method and a non-transitory computer readable medium storing a pathological diagnosis assisting program.

In order to achieve the above object, a pathological diagnosis assisting apparatus for providing diagnosis assisting information from an image of a stained sample according to an embodiment includes:

an image reading unit configured to read the image of the stained sample; and an image processing unit configured to process the image of the stained sample, wherein the image processing unit includes
an image classification unit configured to, based on a pixel value of the image of the stained sample, classify at least one type of a specific substance serving as an index for detection of a lesion in the image of the stained sample,
a tissue area extraction unit configured to extract a tissue area in the image of the stained sample,
an image dividing unit configured to divide the tissue area into a plurality of sections,
a specific substance occupancy rate calculation unit configured to, based on a result of classification of the image, calculate an occupancy rate of the at least one type of the specific substance in each of the plurality of sections, and
a diagnosis assisting information providing unit configured to, based on the calculated occupancy rates in the plurality of sections, determine an intermediate value of the occupancy rate of the specific substance in the image of the sample and to provide the intermediate value as the diagnosis assisting information.

Preferably, according to the pathological diagnosis assisting apparatus of the embodiment, the stained sample is stained with EVG (Elastica Van Gieson) stain.

Preferably, according to the pathological diagnosis assisting apparatus of the embodiment, the at least one type of the specific substance is a collagenous fiber.

Preferably, according to the pathological diagnosis assisting apparatus of the embodiment, the diagnosis assisting information providing unit, in determining the intermediate value, performs weighting based on an area occupancy rate of the tissue area in each of the plurality of sections.

In order to achieve the above object, a pathological diagnosis assisting method according to an embodiment includes:
an image reading step to read an image of a stained sample; and
an image processing step to process the image of the stained sample, wherein the image processing step includes
an image classifying step, based on a pixel value of the image of the stained sample, to classify at least one type of a specific substance serving as an index for detection of a lesion in the image of the stained sample,
a tissue area extracting step to extract a tissue area in the image of the sample,
an image dividing step to divide the tissue area into a plurality of sections,
a specific substance occupancy rate calculation step, based on a result of classification of the image, to calculate an occupancy rate of the at least one type of the specific substance in each of the plurality of sections, and
a diagnosis assisting information providing step, based on the calculated occupancy rates in the plurality of sections, to determine an intermediate value of the occupancy rate of the specific substance in the image of the sample and to provide the intermediate value as diagnosis assisting information.

In order to achieve the above object, a non-transitory computer readable medium storing a pathological diagnosis assisting program according to an embodiment makes a computer serving as a pathological diagnosis assisting apparatus for providing diagnosis assisting information from an image of a stained sample execute:
an image reading step to read an image of a stained sample;
an image classifying step, based on a pixel value of the image of the stained sample, to classify at least one type of a specific substance serving as an index for detection of a lesion in the image of the stained sample;
a tissue area extracting step to extract a tissue area in the image of the sample;
an image dividing step to divide the tissue area into a plurality of sections;
a specific substance occupancy rate calculation step, based on a result of classification of the image, to calculate an occupancy rate of the at least one type of the specific substance in each of the plurality of sections; and
a diagnosis assisting information providing step, based on the calculated occupancy rate in the plurality of sections, to determine an intermediate value of the occupancy rate of the specific substance in the image of the sample and to provide the intermediate value as the diagnosis assisting information.

According to the present embodiment, by automatically calculating an area occupancy rate of the specific substance serving as the index for detection of the lesion, an objective index may be promptly provided for diagnosis of a stage of fibrosis.

DETAILED DESCRIPTION OF EMBODIMENT OF THE INVENTION

A pathological diagnosis assisting apparatus according to one embodiment of the present invention will be described with reference to the accompanying drawings. A pathological diagnosis assisting method and a non-transitory computer readable medium storing a pathological diagnosis assisting program according to the present invention will become clear from the description of the pathological diagnosis assisting apparatus according to the embodiment of the present invention.

A sample used in the present embodiment is stained with, for example, EVG (Elastica Van Gieson) stein. EVG stein may stain a collagenous fiber and an elastic fiber in a tissue.

Adopting this staining method to a lesional tissue obtained in a liver biopsy enables identification of the collagenous fiber in a liver cell. According to the present embodiment, in staining the sample with EVG stain, the elastic fiber is stained purple (dark purple) with Weigert's resorcin-fuchsin stain, a nuclear is stained blackish brown with Weigert's iron hematoxylin, the collagenous fiber is stained red with Van Gieson's stein (acid fuchsin), and the cytoplasm and the erythrocyte are stained yellow with Van Gieson's stein (the picric acid).

An image of the stained sample is a light transmissive image obtained by, for example, exposing transmissive lights to the stained sample and taking an image of the sample by a digital camera or a sample scanner. Needless to say, a polarization image obtained by a polarization microscope or the like may be used when the collagenous fiber is distinguishable from other components in the tissue. Further, not only image data taken by an imaging apparatus using a CCD (Charge Coupled Device) image sensor or a CMOS (Complementary Metal Oxide Semiconductor) image sensor but image data obtained by processing a color photograph taken by a film camera may also be used.

Figure 1:
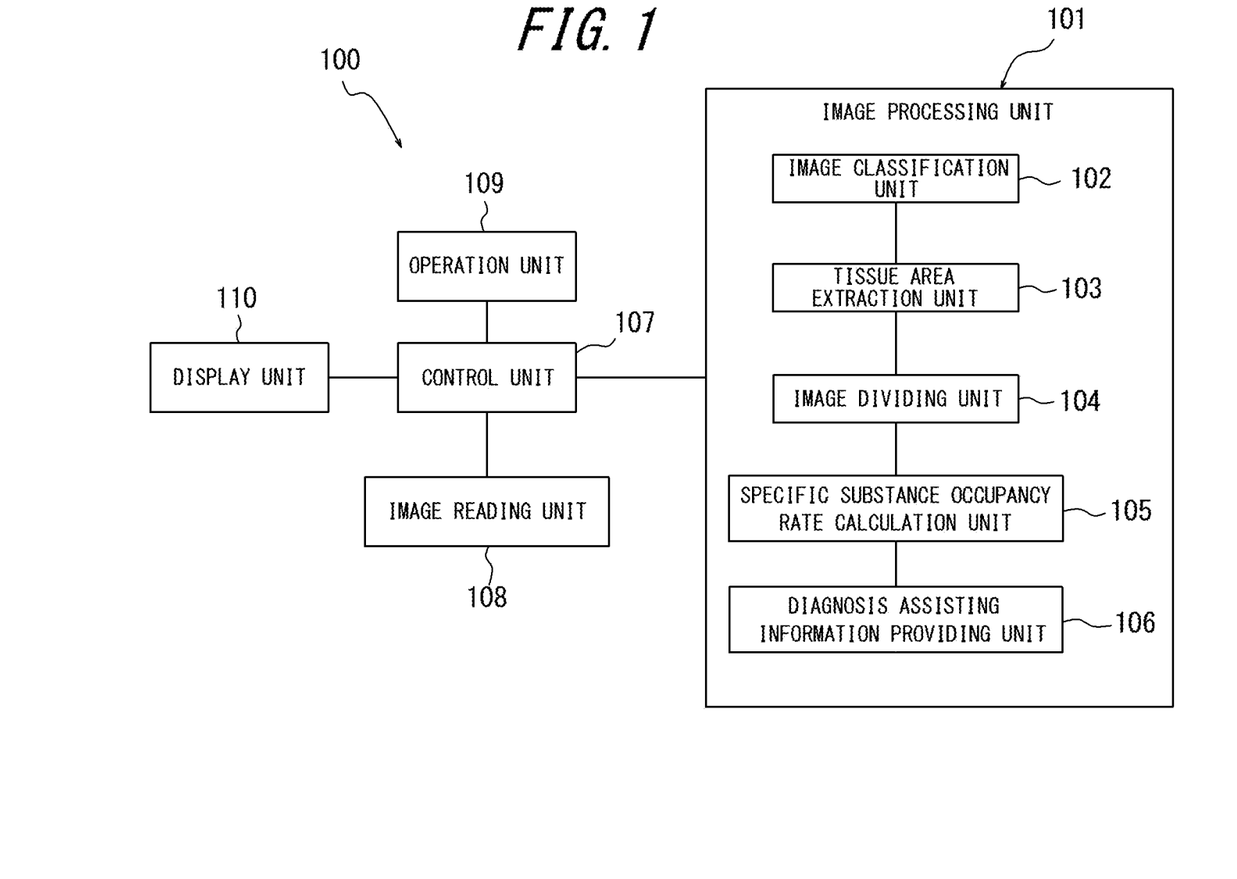
FIG. 1 is functional block diagram illustrating a pathological diagnosis assisting apparatus according to one embodiment of the present invention.

FIG. 1 is a functional block diagram illustrating a pathological diagnosis assisting apparatus according to one embodiment of the present invention. A pathological diagnosis assisting apparatus 100 includes an image reading unit 108 configured to read the image of the stained sample, an image processing unit 101 configured to process the image of the stained sample, a control unit 107 responsible for overall operations of the pathological diagnosis assisting apparatus, an operation unit 109 configured to enable an interactive operation with the operator, and a display unit 110 configured to display the image of the stained sample and the like. The image processing unit 101 includes an image classification unit 102, a tissue area extraction unit 103, an image dividing unit 104, a specific substance occupancy rate calculation unit 105 and a diagnosis assisting information providing unit 106. A detailed function of each function block of the image processing unit 101 will be described below with reference to a flowchart in FIG. 2.

The image processing unit 101 and the control unit 107 are configured by using, for example, CPU (Central Processing Unit) or DSP (Digital Signal Processor). The image reading unit 108 is configured by using, for example, an interface, a CD-ROM reading device or the like. The operation unit 109 functions as an input unit enabling the interactive operation with a user and is configured by using, for example, a keyboard or a touch panel. The display unit 110 is configured by using, for example, a liquid crystal display, a plasma display or a CRT display and displays a stained image read from the image reading unit 108. Note that the image reading unit 108, the operation unit 109 and the display unit 110 do not need to be built in the pathological diagnosis assisting apparatus 100 but may be removably attached thereto.

Each functional block of the image processing unit 101 does not need to be physically separated from each other. That is, a function of each functional block may be implemented by a single CPU or DSP. As described below, further, the function of each functional block may be implemented by a program. In this case, the program enabling execution of a series of functions read from a recording medium such as a CD-ROM may be stored in a memory unit (not illustrated) and appropriately run by the control unit 107.

Figure 2:
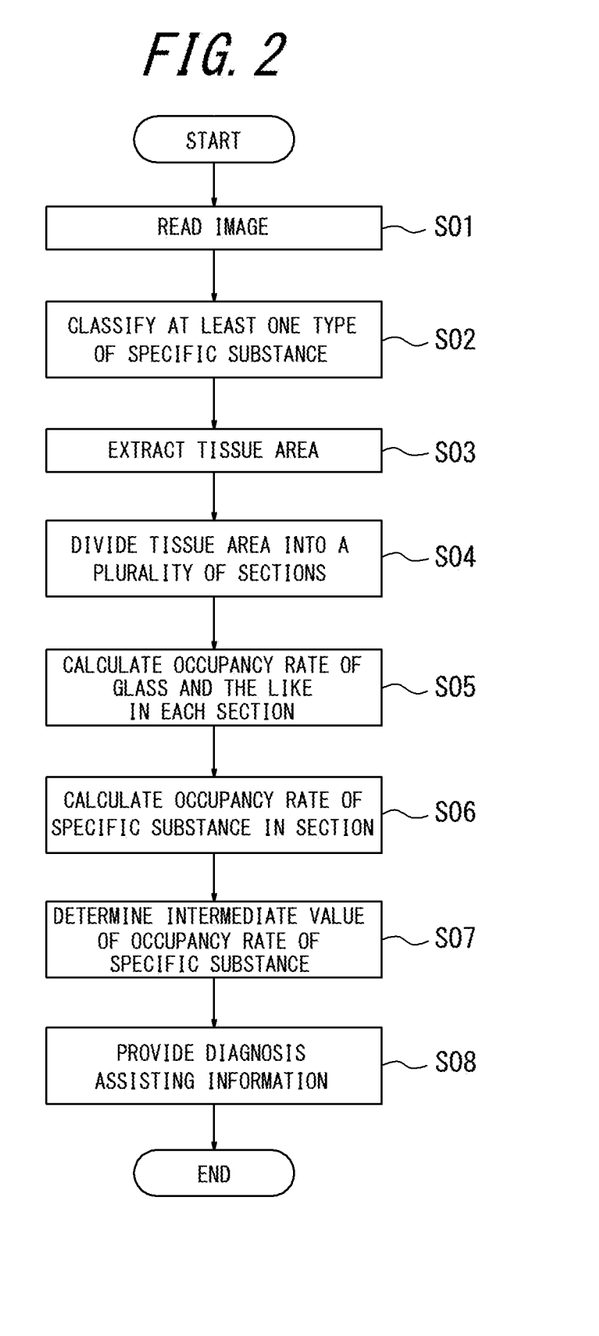
FIG. 2 is a flowchart illustrating a process performed by the pathological diagnosis assisting apparatus illustrated in FIG. 1.
Figure 3:
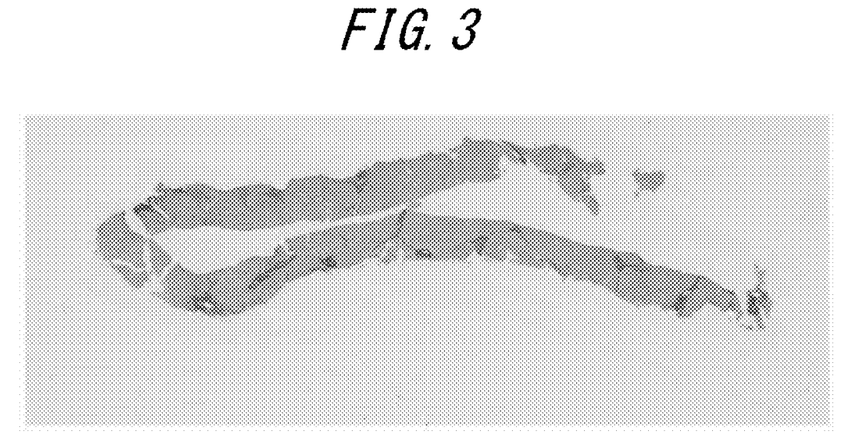
FIG. 3 is a diagram illustrating an example of a stained sample analyzed in one embodiment of the present invention.

FIG. 2 is a flowchart illustrating a process performed by the pathological diagnosis assisting apparatus illustrated in FIG. 1. The control unit 107 reads the image of the stained sample via the image reading unit 108 and stores information on the stained image of the sample in the memory unit (not illustrated) (step S01). According to the present embodiment, the image of the stained sample is an image of the sample obtained in the liver biopsy and stained with EVG stein. FIG. 3 illustrates an example of the image. In the figure, a C-shaped area extending at the center represents a tissue area in the image of the stained sample, and other areas represent the glass having the stained sample placed thereon and the like. A plurality of empty areas white in color scattered in the tissue area represent a caliber of the blood vessel and the like. Areas relatively dark in color surrounding the empty areas represent the elastic fiber and the collagenous fiber.

Next, based on a pixel value of the image of the stained sample, the image classification unit 102 classifies at least one type of a specific substance in the image of the sample (step S02). This classification is performed by, for example, supervised classification using a posterior probability maximization method. In detail, classes are set for classifying the collagenous fiber, which is the specific substance serving as the index for detection of a lesion, the nuclear, elements included in cells forming the tissue of the cytoplasm and the like, and the glass and the like occupying outside the tissue area. Then, the classification is performed based on training data of each of the classes. According to the present embodiment, it is not necessary to obtain the training data for the image of the stained sample to be classified but the training data obtained for another image of the stained sample may be used in classification. Moreover, in the supervised classification, a maximum likelihood method and a nearest neighbor method may also be used. Further, instead of the supervised classification, unsupervised classification such as clustering may be performed.

Figure 4:
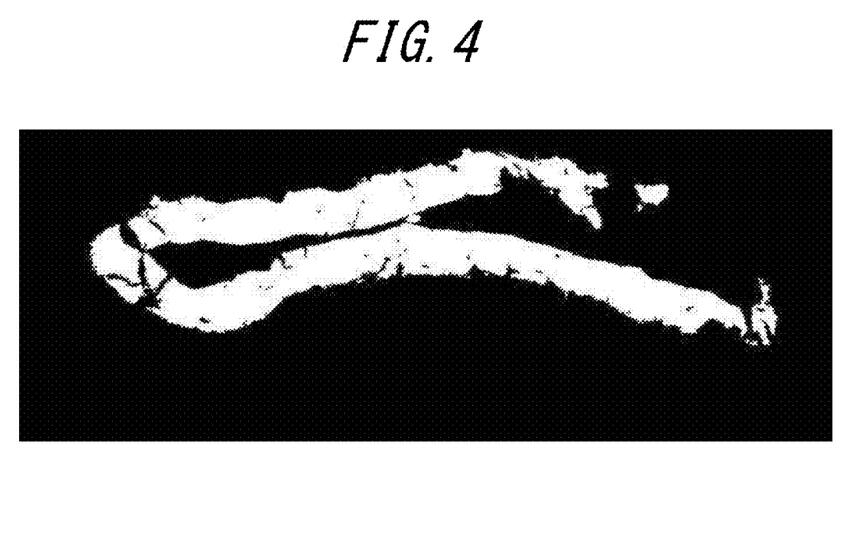
FIG. 4 is a diagram illustrating an example of a result of extraction of a tissue area according to one embodiment of the present invention.

Next, the tissue area extraction unit 103 extracts the tissue area in the image of the sample (step S03). FIG. 4 illustrates an example of a result of extraction of the tissue area by the tissue area extraction unit 103. Here, the tissue area extraction unit 103 performs mask processing to the area classified as the area outside the sample tissue such as the glass or the like, for example, at step S02. The tissue area extraction area 103 does not need to perform the mask processing based on the result of classification at step S02 but may perform the mask processing to all pixels having pixel values equal to or higher than any threshold. This is because, in a stained pathology sample, the tissue is stained in some color and non-stained area is transparent and thus has a high pixel value in the light transmissive image.

Figure 5:
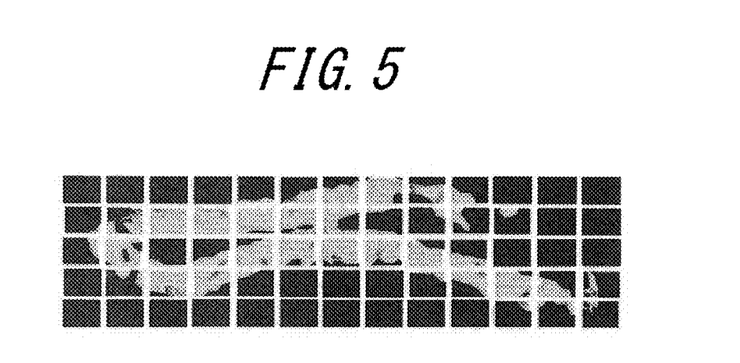
FIG. 5 is a diagram illustrating an example of a divided image according to one embodiment of the present invention.

Next, the image dividing unit 104 divides the tissue area into a plurality of sections (step S04). Each section includes a plurality of pixels. FIG. 5 illustrates an example of a result of image dividing by the image dividing unit 104. The plurality of sections are square in shape, 0.1 mm, 0.25 mm, 0.5 mm, 1 mm or 2 mm on a side, for example. The sections do not need to be square in shape but may be, for example, rectangular in shape. A size of the section may be appropriately adjusted based on a gauge of a biopsy needle used for the liver biopsy and the like.

Next, the specific substance occupancy rate calculation unit 105 calculates an occupancy rate of pixels classified as the class for the glass and the like in each of the sections at step S02 (step S05). The specific substance occupancy rate calculation unit 105 calculates the occupancy rate of the pixels classified as the class for the glass and the like in all pixels in each of the sections. The specific substance occupancy rate calculation unit 105, for sections having calculated occupancy rates equal to or higher than a predetermined value, does not perform operations at the following steps. The predetermined value includes, but not limited to, 80-90% or more, for example. Note that the operation at step S05 may be performed after step S06.

Next, the specific substance occupancy rate calculation unit 105, based on the result of classification of the image at step S02, calculates the occupancy rate of at least one type of the specific substance in each of the plurality of sections (step S06). According to the present embodiment, as described above, the specific substance is the collagenous fiber and, as the occupancy rate in each of the sections, a rate of the pixels classified as the collagenous fiber in all pixels in each of the sections is calculated. Note that, without relying on the pixels, the occupancy rate may be calculated based on the size of each of the sections and a size of an area classified as the collagenous fiber.

Next, the diagnosis assisting information providing unit 106, from the calculated occupancy rates of the sections, determines the intermediate value of the occupancy rate of the specific substance in the image of the sample (step S07). The diagnosis assisting information providing unit 106, in detail, performs a statistical process to the occupancy rate of the specific substance calculated at step S06 for a plurality of sections where the occupancy rate of the area in the section classified as the glass and the like calculated at step S05 is smaller than the predetermined value (hereinafter, referred to as a "subject section"). The area of the glass and the like in the image of the stained sample is not necessary for a medical diagnosis. The "subject section" will be described in detail below with reference to FIG. 6.

The statistic process determines the intermediate value of the occupancy rate of the specific substance in the image. In detail, the occupancy rate of the specific substance in the middle of the occupancy rates of the specific substance in all subject sections arranged in an ascending order or a descending order is determined as the intermediate value. When the number of subject sections is an even number, the diagnosis assisting information providing unit 106 calculates an average value of two values close to the middle in the order and determines the average value as the intermediate value. Although the term "intermediate value" is used in the present specification, a statistical value meaning the intermediate value in the present invention may also be referred to as a median or a median value. In determining the intermediate value, further, the diagnosis assisting information providing unit 106 may perform weighting based on an occupancy rate of the tissue area in each of the plurality of sections. In this case, the diagnosis assisting information providing unit 106, in operation to obtain a frequency distribution for determining the intermediate value, for example, calculates a total of the occupancy rates of the tissue area (tissue area occupancy rate) of each section in each class, instead of calculating a total number of sections in each class. The operation associated with weighting performed by the diagnosis assisting information providing unit 106 will be described in detail below.

Figure 6:
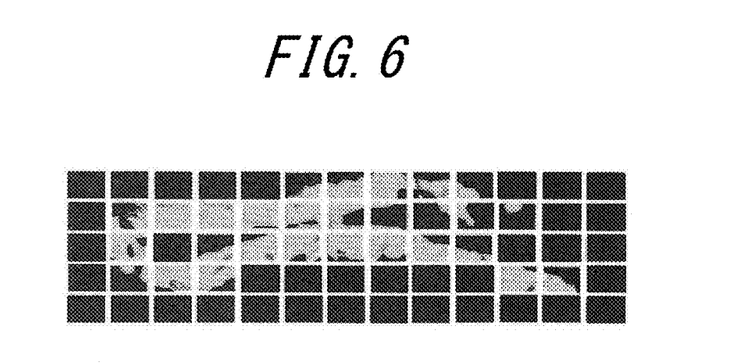
FIG. 6 is a diagram illustrating determination of an intermediate value according to one embodiment of the present invention.

FIG. 6 is a diagram illustrating determination on the intermediate value according to the present embodiment. The sections in black has the occupancy rate of the glass and the like equal to or higher than the predetermined value and thus are not the subject sections. The "subject section" has the occupancy rate of the glass and the like lower the predetermined value and includes a sufficient occupancy rate of the tissue area. At step S06, calculation of the occupancy rate of the specific substance is performed for non-black sections, that is, the subject sections. Further, at step S07, the intermediate value of the occupancy rate of the specific substance is determined based on the occupancy rate of the specific substance in all of the subject sections.

Next, the diagnosis assisting information providing unit 106 provides the intermediate value determined at step S07 as diagnosis assisting information (step S08). In detail, the diagnosis assisting information providing unit 106 stores the intermediate value determined at step S07, as the diagnosis assisting information, in the memory unit (not illustrated). Further, the diagnosis assisting information providing unit 106 may display the diagnosis assisting information on the display unit 110.

As described above, the pathological diagnosis assisting apparatus and the pathological diagnosis assisting method according to the present embodiment classify the image of the stained sample, divide the image of the stained sample into a plurality of sections as well as performing the statistical process to the sections other than the sections having the unnecessary portion such as the glass and the like in the stained image equal to or higher than the predetermined value, and determines the intermediate value of the occupancy rate of the specific substance as medical diagnosis assisting information. Thereby, the medical diagnosis assisting information may be obtained automatically and promptly based on the image of the stained sample. Especially, since the image of the stained sample is divided into a plurality of sections and the intermediate value is determined as the medical diagnosis assisting information from the occupancy rates of the specific substance in all of the subject sections, there is an advantage to be able to reduce an influence of the existing collagenous fiber forming not the lesion but the blood vessel and the like, which affects the medical diagnosis and thus has been conventionally manually eliminated by a mask processing. The following is a detailed description of this advantage with reference to FIG. 7.

Figure 7:
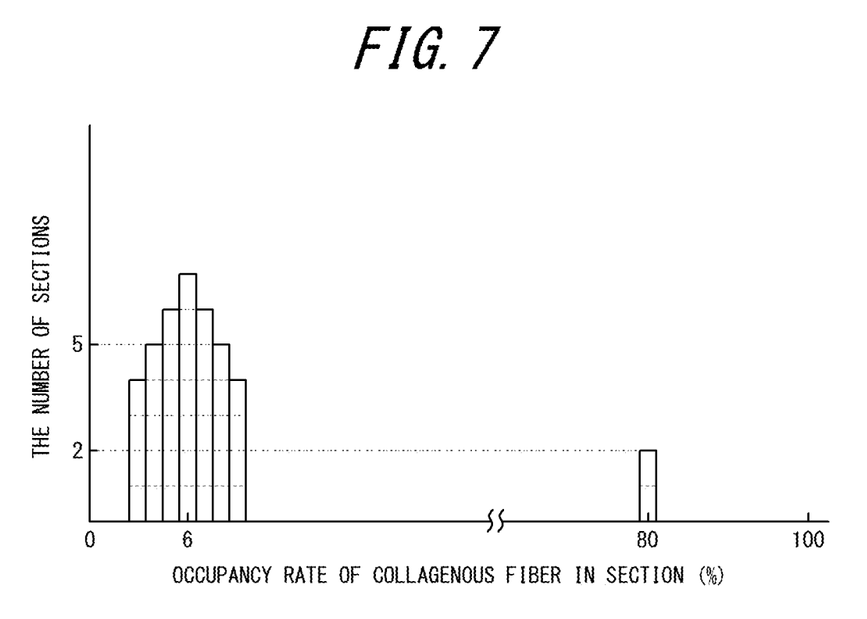
FIG. 7 is a diagram illustrating determination of the intermediate value according to one embodiment of the present invention.

FIG. 7 is a diagram illustrating the determination on the intermediate value according to the present embodiment. The result of calculation of the occupancy rate of the specific substance at step S06 in all of the subject sections in the image of the stained sample is illustrated in a histogram (the frequency distribution) as an example. The data illustrated for the sake of description are simplified and thus not actual data. A horizontal axis represents the occupancy rate of the collagenous fiber (specific substance) in each section, and a vertical axis represents the number of sections corresponding to each occupancy rate. The number of subject sections is 39. Although two sections have 80% of an outstanding occupancy rate of the specific substance, most of the sections have 3-9% of the occupancy rate of the collagenous fiber. According to the present embodiment, as described above, the intermediate value of the occupancy rate of the collagenous fiber in the subject sections is obtained at step S07 and determined as the medical diagnosis assisting information at step S08. Accordingly, the diagnosis assisting information providing unit 106 determines the occupancy rate of the collagenous fiber in the 20th section at the center as the medical diagnosis assisting information. In detail, since the 20th section has 6% of the occupancy rate of the collagenous fiber, the diagnosis assisting information providing unit 106 determines the rate 6% as the medical diagnosis assisting information.

On the other hand, when the average value is calculated instead of the intermediate value, because of influence of two sections having the outstanding 80% of the occupancy rate of the collagenous fiber, the average value is approximately 9.79%. However, an area where the collagenous fibers concentrate in comparison to other areas in the image of the stained sample is generally considered as the collagenous fiber forming a normal blood vessel instead of lesional collagenous fiber. Accordingly, such areas have been manually eliminated in the mask processing and data compilation processing. However, while being advantageous to improvement in diagnostic accuracy, the manual mask processing and the data complication processing are very artificial and thus cause a variation in the accuracy between the operators. As described above, however, since the pathological diagnosis assisting apparatus and the pathological diagnosis assisting method according to the present embodiment provide the intermediate value as the medical diagnosis assisting information, the diagnostic accuracy may be improved without the manual mask processing and the data complication processing.

The following is a description comparing the statistical process for determining the intermediate value associated with weighting and the statistical process for determining the intermediate value not associated with weighting. At step S07 described above, in order to obtain the median of the occupancy rate of the specific substance in the plurality of sections in the image of the stained sample, it is necessary to create the frequency distribution illustrated in FIG. 7 as an example. For example, when the number of classes (bins) is defined as N=100, since the occupancy rate of the specific substance is 0-100%, the frequency distribution has a class interval of 1%. Also, a frequency h(x) in each class represents the number of sections having the occupancy rate of the specific substance corresponding to each class. The frequency h (x) is represented by a formula (1) below.

$$h(x)\ (x=1,2,\ldots,100) \quad (1)$$

The frequency h(x) in each class is updated by the following formula (2).

$$h(x)=h'(x)+1\ (x=1,2,\ldots,100) \quad (2)$$

Here, h'(x) represents a frequency before update. In detail, in the image of the stained sample including a plurality of sections, when the occupancy rate of the specific substance, the collagenous fiber, is 30% in a section No. i, one frequency is added to the class h (31) as indicated by the following formula (3).

$$h(31)=h'(31)+1 \quad (3)$$

However, since the formula (2) does not consider an area occupancy rate of the tissue area in the section, both of when the occupancy rate of the specific substance is 30% in the sections having a high occupancy rate (for example, 90%) of the tissue area and when the occupancy rate of the specific substance is 30% in the section having a low occupancy rate (for example, 10%) of the tissue area, "one frequency" is equally added to the frequencies of the corresponding classes. As described above, when the section having a large occupancy rate of the tissue area and the section having a small occupancy rate of the tissue area are equally dealt in creation of the frequency distribution, the section having the small occupancy rate of the tissue area may have a slightly strong impact on determination of the intermediate value.

Therefore, a term in consideration of the tissue area in the section is added to the formula (2) and the frequency in each class is calculated from the following formula (4).

$$h(x)=h'(x)+\alpha(Ti)\ (x=1,2,\ldots,100) \quad (4)$$

Here, Ti represents the occupancy rate of the tissue in the section No. i, and $\alpha(Ti)$ represents a function corresponding to the tissue area. For example, $\alpha(Ti)$ is calculated from the following formula (5).

$$\alpha(Ti)=100\times Ti \quad (5)$$

The above formula (5) is used for calculation of the occupancy rate of the tissue in the section No. i in percentage. For example, a non-linear function other than the above formula (5) may also be employed as $\alpha(Ti)$.

As described above, by performing weighting and determining the intermediate value of the occupancy rate of the specific substance in a section having a large area occupancy rate of the tissue area and the occupancy rate of the specific substance in a section having a small area occupancy rate of the tissue area, the intermediate value is determined. Thereby, more accurate diagnosis assisting information may be provided.

Figure 8:
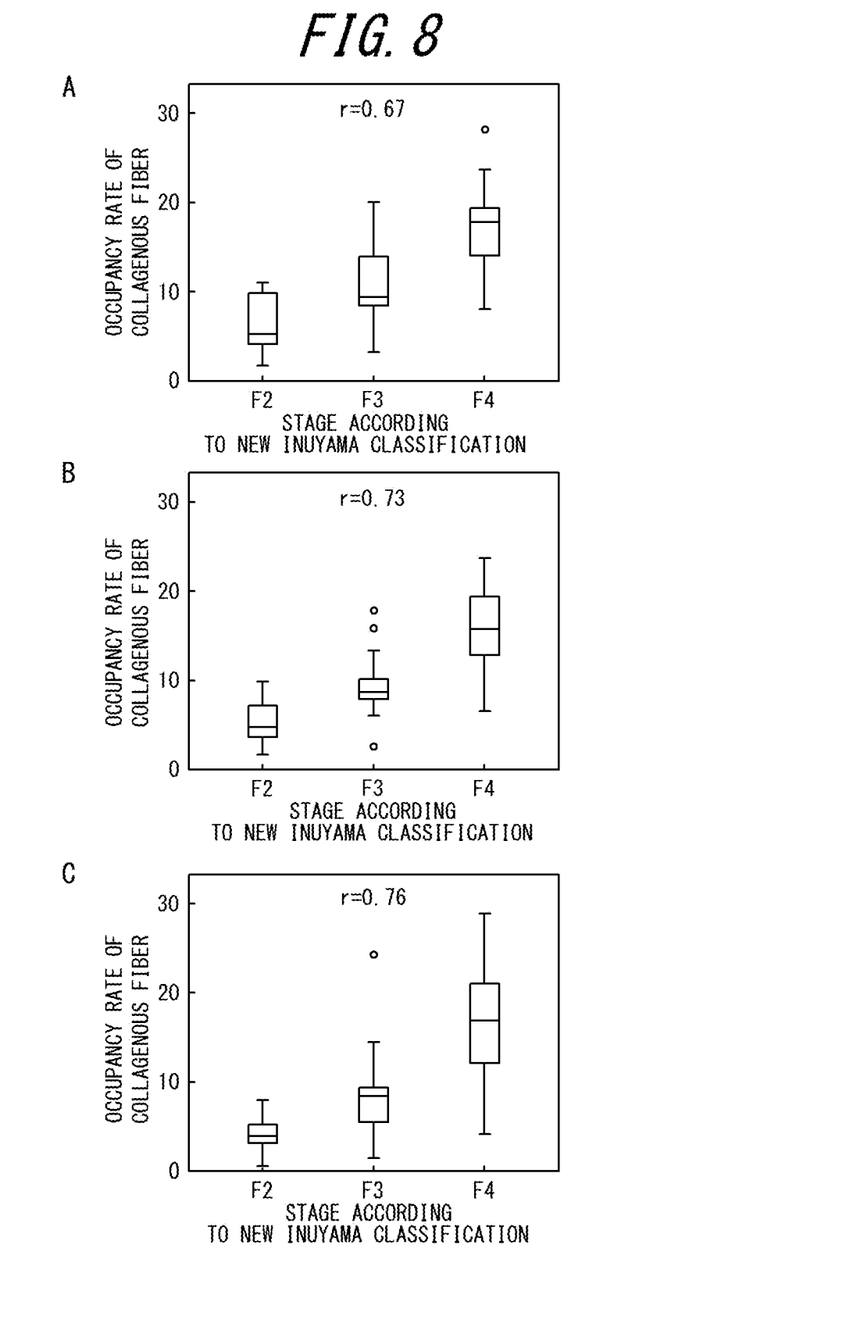
FIG. 8A is a diagram illustrating a relationship between New Inuyama Classification and an average value of an occupancy rate of a collagen cell in a subject section.
FIG. 8B is a diagram illustrating a relationship between New Inuyama Classification and an average value of an occupancy rate of a fiber in the subject section, when the mask processing is manually performed.
FIG. 8C is a diagram illustrating a relationship between New Inuyama Classification and an intermediate value of the occupancy rate of the fiber in the subject section (a square, 0.5 mm on a side) according to one embodiment.

The following is a description of a case, with reference to Table 1 and FIG. 8A to FIG. 8C, when the medical diagnosis assisting apparatus and the medical diagnosis assisting method according to the present invention calculate the occupancy rate of the specific substance, the collagenous fiber, and provide the occupancy rate as the medical diagnosis assisting information, based on actual data. Table 1 illustrates a relationship among pathological diagnosis results based on New Inuyama Classification by a pathologist and an average value of the occupancy rate of the collagenous fiber, an average value obtained through the manual mask processing, and the intermediate value according to the present embodiment, in the subject sections. FIG. 8A is a diagram illustrating a relationship between New Inuyama Classification and the average value of the occupancy rate of the collagenous fiber in the subject section. FIG. 8B is a diagram illustrating a relationship between New Inuyama Classification and the average value of the occupancy rate of the collagenous fiber in the subject section subjected to the manual mask processing. FIG. 8C is a diagram illustrating a relationship between New Inuyama Classification and the average value of the occupancy rate of the collagenous fiber in the subject section (square, 0.5 mm on a side) according to the present embodiment. In each box plot illustrated in FIG. 8A to FIG. 8C, a horizontal axis represents classes according to New Inuyama Classification and a vertical axis represents the occupancy rate of the collagenous fiber.

Since New Inuyama Classification is a pathological diagnosis method widely practiced by pathologists in recent years, it is important to assess a correlation between the diagnosis assisting information and a diagnosis result based on New Inuyama Classification in order to examine usefulness of the pathological diagnosis assisting apparatus according to the present embodiment. The number of images of the stained sample used for the assessment was n=38. Each of the 38 images of the stained sample was obtained from a different specimen. The needle used for preparing the stained sample was of 18 G

TABLE 1

|  | Correlation Coefficient | Area under ROC Curve (>F2) | Area under ROC Curve (>F3) |
|---|---|---|---|
| Occupancy Rate of Collagenous Fiber (Average Value) | 0.67 | 0.83 | 0.89 |
| Occupancy Rate of Collagenous Fiber (Average Value after Mask Processing) | 0.73 | 0.88 | 0.90 |
| Occupancy Rate of Collagenous Fiber (Intermediate Value) Length of one side of section (mm) | | | |
| 2 | 0.68 | 0.86 | 0.86 |
| 1 | 0.74 | 0.89 | 0.89 |
| 0.5 | 0.76 | 0.92 | 0.89 |
| 0.25 | 0.77 | 0.91 | 0.90 |
| 0.1 | 0.68 | 0.87 | 0.85 |

The correlation coefficients in Table 1 are Spearman's rank-correlation coefficients. Table 1 also illustrates, as an index for estimation of the correlation, an area under the ROC (Receiver Operating Characteristic) curve. The area under the ROC curve indicates a value of a specimen classified as F2 or higher, or F3 or higher as a result of New Inuyama Classification.

Table 1 further illustrates that, in order to obtain the intermediate value of the occupancy rate of the collagenous fiber by the medical diagnosis assisting apparatus and the medical diagnosis assisting method according to the present embodiment, the intermediate values in the sections in various sizes were calculated and results of the correlation were assessed. It was found that, for all of a correlation coefficient, the area under the ROC curve (>F2) and the area under the ROC curve (>F3), when the section has one side of 0.25-1 mm in length, the intermediate value tends to highly correlate with a diagnostic result based on New Inuyama Classification. Especially, the intermediate value at a low stage (>F2) of fibrosis highly correlates.

In box plots illustrated in FIG. 8A to FIG. 8C, a range between 25% and 75% from the top of the average value of all sections arranged in the ascending order is indicated by a "box". Accordingly, in order to make the value of the occupancy rate of the collagenous fiber indicated by the vertical axis efficient as the index for diagnosis assisting, ranges of the occupancy rate of the collagenous fiber indicated by the "box" at the stages F2 to F4 preferably do not overlap with each other. Also, the average value of the occupancy rate of the collagenous fiber calculated for each of the stages F2-F4 corresponds to a thick line in each of the "box".

As illustrated in FIG. 8A, when the average values of all of the sections are obtained without performing the mask processing, the areas of the occupancy rates of the collagenous fiber indicated by the "boxes" overlap with each other especially between the stage F2 and the stage F3. In the areas where the "boxes" overlap with each other, the occupancy rate of the collagenous fiber is not effective as the diagnosis assisting information. On the other hand, when the average values of the sections in the image of the stained sample calculated by manually performing the mask processing are used, the "boxes" of the stages F2-F4 do not overlap with each other. Similarly, when the intermediate values are used as illustrated in FIG. 8C, the "boxes" of the stages F2-F4 do not overlap with each other, either. Accordingly, when the mask processing is manually performed or the intermediate values according to the present embodiment are used, the occupancy rate of the collagenous fiber may become effective as the diagnosis assisting information. Further, since the result indicates a high correlation with the diagnosis result by New Inuyama Classification as described above, it is suggested that METAVIR fibrosis score highly correlated to New Inuyama Classification may obtain a highly correlated result as well.

With reference to Table 2, the following is a description of a correlation between the occupancy rate of the specific substance, the collagenous fiber, calculated by using the pathological diagnosis assisting apparatus according to the present embodiment and the occupancy rate of the specific substance calculated by manually performing the mask processing, based on actual data. Table 2 illustrates a correlation between occupancy rates of the specific substance in the sections in various sizes calculated by the pathological diagnosis assisting apparatus according to the present embodiment and the occupancy rates of the specific substance calculated by manually performing the mask processing. Further, for comparing purposes, Table 2 also illustrates a correlation between the occupancy rate of the specific substance calculated without manually performing the mask processing and the occupancy rate of the specific substance calculated by manually performing the mask processing. The number of used images of the stained sample was n=38. Each of the 38 images of the stained sample was obtained from a different specimen. The needle used for preparing the stained sample was of 18 G.

TABLE 2

| | No Section | With Section, Intermediate Value Used | | | | |
|---|---|---|---|---|---|---|
| Length on One Side of Section (mm) | — | 2 | 1 | 0.5 | 0.25 | 0.1 |
| Correlation Coefficient | 0.924 | 0.915 | 0.937 | 0.958 | 0.944 | 0.931 |

Table 2 indicates that, when the section having one side 0.25-1 mm in length is used by the pathological diagnosis assisting apparatus and the pathological diagnosis assisting method according to the present embodiment, the occupancy rate of the specific substance has a relatively high correlation with that calculated by manually performing the mask processing. This may be because, when the pathological diagnosis assisting apparatus according to the present embodiment calculates the occupancy rate of the specific substance by using the intermediate value for the plurality of sections having a predetermined length on one side, an effect similar to that when the manual mask processing eliminates the existing fiber area and artifact caused in preparing the pathology sample may be obtained. It is considered that such effect contributes to an improvement in the correlation between histological scoring such as New Inuyama Classification and the occupancy rate of the specific substance obtained according to the present embodiment.

Next, efficacy of weighing in determination of the intermediate value will be described with reference to actual data. Here, the collagenous fiber is used as the specific substance. Table 3 illustrates a correlation among the occupancy rates of the specific substance obtained by determining the intermediate value without weighting, the occupancy rates of the specific substance obtained by determining the intermediate value by performing weighting, both of which were obtained by the pathological diagnosis assisting apparatus and the pathological diagnosis assisting method according to the present embodiment, and the histological scoring. The number of images of the stained sample used for calculation of the occupancy rate of the specific substance was n=38. Each of the 38 images of the stained sample was obtained from a different specimen. The needle used for preparing the stained sample was of 18 G

TABLE 3

| | With Section, Intermediate Value Used Length on One Side of Section (mm) | | | | |
|---|---|---|---|---|---|
| | 2 | 1 | 0.5 | 0.25 | 1 |
| Correlation Coefficient (Without Weighting) | 0.68* | 0.74* | 0.76* | 0.77* | 0.68* |
| Correlation Coefficient (With Weighting) | 0.78* | 0.76* | 0.75* | 0.78* | 0.36 |

As can be seen in the table, in the sections having one side of 2 mm, 1 mm or 0.25 mm in length, the correlation coefficients with weighting have values larger than those without weighting. Especially in the section having one side of 2 mm in length, it can be seen that, since the size of the tissue area varies in each section depending on image dividing mode, correction of the frequency distribution by weighting improves the correlation coefficient. When weighting is performed, the correlation coefficients in all of the sections except for ones having one side of 0.1 mm in length are similar to or higher than the correlation coefficients without weighting. Accordingly, it is indicated that weighting is effective in obtaining the occupancy rate of the specific substance by using the intermediate value. In the table, an asterisk "*" represents a significance level of 0.1%.

Although one embodiment of the present invention is described above, the pathological diagnosis assisting apparatus 100 in one mode of the present invention may be configured by using a computer. In such a computer, the program for implementing the function of the image processing unit 101 is stored in the computer or an external memory unit. The external memory unit may be an external storage device such as an external hard disk or an internal storage device such as ROM (Read Only Memory) or RAM (Random Access Memory). The computer functioning as described above may be controlled by the CPU (Central Processing Unit) or the like. That is, the CPU, by appropriately reading the program describing an operation to implement a function of each component from the memory unit, may implement the function of each component on the computer. Here, the function of each component may be implemented by a part of hardware.

Or, the program describing the operation may be stored in a portable (non-transitory) storage medium such as, for example, DVD (Digital Versatile Disc) or the CD-ROM to be distributed through selling, giving, renting and the like of the medium. Further, distribution of the program may be made by storing the program in a memory unit of a server in a network and transferring the program from the server to another computer via the network.

Such a computer for executing the program may once store, for example, the program stored in the portable storage media or the program transferred from the server in a memory unit thereof. In another embodiment of the program, the computer may read the program directly from the portable storage medium and execute an operation according to the program. Further, each time the program is transferred to the computer from the server, the computer may sequentially execute operations according to the received program.

In addition to the embodiment of the present invention described above, a various change may be made to CLAIMS. For example, although the collagenous fiber is used as the specific substance for the pathological diagnosis in the above embodiment, other substances that may provide the pathological diagnosis assisting information based on an amount and distribution in the tissue may also be used as the specific substance. For example, by using the pathological diagnosis assisting information based on another specific substance different from the collagenous fiber as well as that based on the collagenous fiber, accuracy of the pathological diagnosis may be further improved.

Moreover, for example, although an EVG stained image is used in the above embodiment, a staining method is not limited thereto. As long as the stained sample includes the collagenous fiber stained in color distinguishable from other components of the tissue, any staining method may be used for the pathological diagnosis assisting apparatus, the pathological diagnosis assisting method and the non-transitory computer readable medium storing a pathological diagnosis assisting program according to the present invention.

Further, although in the above embodiment the pathological diagnosis assisting apparatus according to the present invention is used for the stained pathology sample prepared from the lesional sample obtained by the liver biopsy, the pathological diagnosis assisting apparatus according to the present invention may be used not only for the stained pathology sample obtained by the liver biopsy but also for providing the pathological diagnosis assisting information about fibrosis of other organs, such as the lung, for example.

EXPLANATION OF REFERENCE NUMERALS

100 Pathological Diagnosis Assisting Apparatus
101 Image Processing Unit
102 Image Classification Unit
103 Tissue Area Extraction Unit
104 Image Dividing Unit
105 Specific Substance Occupancy Rate Calculation Unit
106 Diagnosis Assisting Information Providing Unit
107 Control Unit
108 Image Reading Unit
109 Operation Unit
110 Display Unit

What is claimed is:

1. A pathological diagnosis assisting apparatus for providing diagnosis assisting information from an image of a stained sample, comprising:
    an image reading unit configured to read the image of the stained sample; and
    an image processing unit configured to process the image of the stained sample, wherein the image processing unit includes:
    an image classification unit configured to, based on a pixel value of the image of the stained sample, classify at least one type of a specific substance serving as an index for detection of a lesion in the image of the stained sample, a tissue area extraction unit configured to extract a tissue area in the image of the stained sample, an image dividing unit configured to divide the tissue area into a plurality of equally sized sections, a specific substance occupancy rate calculation unit configured to, based on a result of classification of the image, calculate an occupancy rate of the at least one type of the specific substance in each of the plurality of sections, and
    a diagnosis assisting information providing unit configured to, based on the calculated occupancy rates in the plurality of sections, determine an intermediate value of the occupancy rate of the specific substance in the image of the sample and to provide the intermediate value as the diagnosis assisting information,
    wherein the determination of the intermediate value of the occupancy rate of the specific substance in the image of the sample comprises calculating the intermediate value by weighting the occupancy rate of the specific substance in each of the plurality of sections based on an area occupancy rate of the tissue area in each respective section where an occupancy rate of glass is less than a predetermined value,
    wherein the at least one type of the specific substance is a collagenous fiber.

2. The pathological diagnosis assisting apparatus according to claim 1, wherein the stained sample is stained with EVG (Elastica Van Gieson) stain.

3. A pathological diagnosis assisting method for providing diagnosis assisting information from an image of a stained sample, comprising:
    an image reading step to read the image of the stained sample; and
    an image processing step to process the image of the stained sample, wherein the image processing step includes an image classifying step, based on a pixel value of the image of the stained sample, to classify at least one type of a specific substance serving as an index for detection of a lesion in the image of the stained sample, a tissue area extracting step to extract a tissue area in the image of the sample, an image dividing step to divide the tissue area into a plurality of equally sized sections, a specific substance occupancy rate calculation step, based on a result of classification of the image, to calculate an occupancy rate of the at least one type of the specific substance in each of the plurality of sections, and a diagnosis assisting information providing step, based on the calculated occupancy rates in the plurality of sections, to determine an intermediate value of the occupancy rate of the specific substance in the image of the sample and to provide the intermediate value as the diagnosis assisting information, wherein the determination of the intermediate value of the occupancy rate of the specific substance in the image of the sample comprises calculating the intermediate value by weighting the occupancy rate of the specific substance in each of the plurality of sections based on an area occupancy rate of the tissue area in each respective section where an occupancy rate of glass is less than a predetermined value, wherein the at least one type of the specific substance is a collagenous fiber.

4. A non-transitory computer readable medium storing a pathological diagnosis assisting program makes a computer serving as a pathological diagnosis assisting apparatus for providing diagnosis assisting information from an image of a stained sample execute:

an image reading step to read an image of a stained sample;

an image classifying step, based on a pixel value of the image of the stained sample, to classify at least one type of a specific substance serving as an index for detection of a lesion in the image of the stained sample;

a tissue area extracting step to extract a tissue area in the image of the sample;

an image dividing step to divide the tissue area into a plurality of equally sized sections;

a specific substance occupancy rate calculation step, based on a result of classification of the image, to calculate an occupancy rate of the at least one type of the specific substance in each of the plurality of sections; and a diagnosis assisting information providing step, based on the calculated occupancy rate in the plurality of sections, to determine an intermediate value of the occupancy rate of the specific substance in the image of the sample and to provide the intermediate value as the diagnosis assisting information, wherein the determination of the intermediate value of the occupancy rate of the specific substance in the image of the sample comprises calculating the intermediate value by weighting the occupancy rate of the specific substance in each of the plurality of sections based on an area occupancy rate of the tissue area in each respective section where an occupancy rate of glass is less than a predetermined value, wherein the at least one type of the specific substance is a collagenous fiber.

* * * * *